INVENTOR.
JAMES E. LUTTRELL

June 28, 1949. J. E. LUTTRELL 2,474,483
TRAILER DRAW BAR SUPPORT
Filed Nov. 21, 1946 2 Sheets-Sheet 2
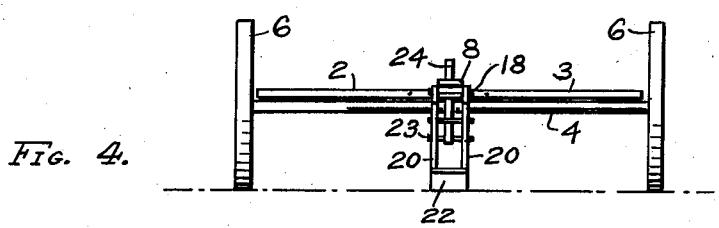
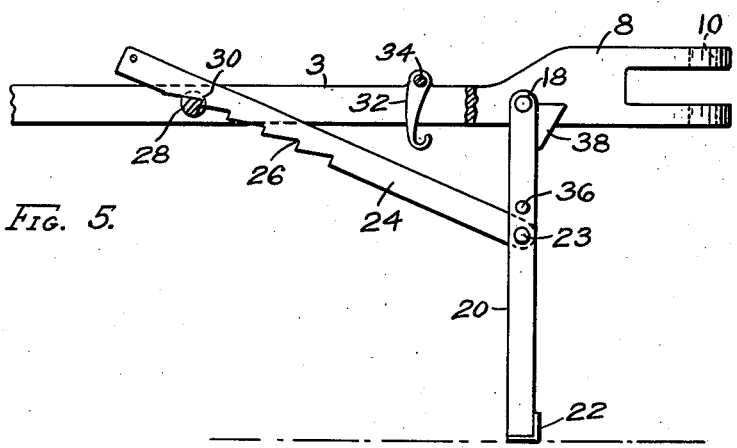
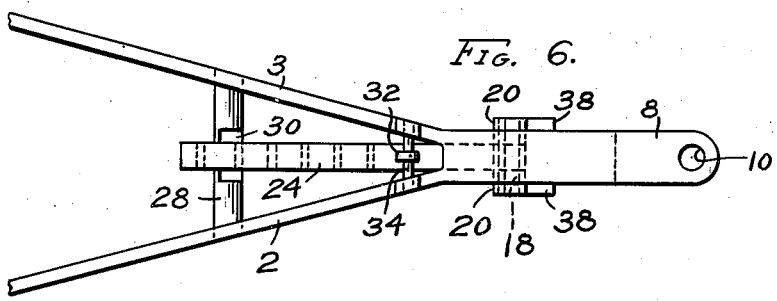
INVENTOR.
JAMES E. LUTTRELL
BY *Victor J. Evans & Co.*
ATTORNEYS Patented June 28, 1949

2,474,483

UNITED STATES PATENT OFFICE 2,474,483

TRAILER DRAWBAR SUPPORT

James E. Luttrell, Burgess Store, Va.

Application November 21, 1946, Serial No. 711,374

2 Claims. (Cl. 280—33.4)

My present invention relates to an improved tractor hitch and more particularly to a hitch which will, upon reverse movement of the tractor, automatically lower a ground engaging member to elevate the hitch so that the hitch may be disconnected, and then to support the hitch of the drawn vehicle in elevated position.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 4 is a front elevational view of the tractor vehicle and hitch.

Fig. 5 is a detail view of the lowering mechanism lowered.

Fig. 6 is a top plan view.

Figure 1:
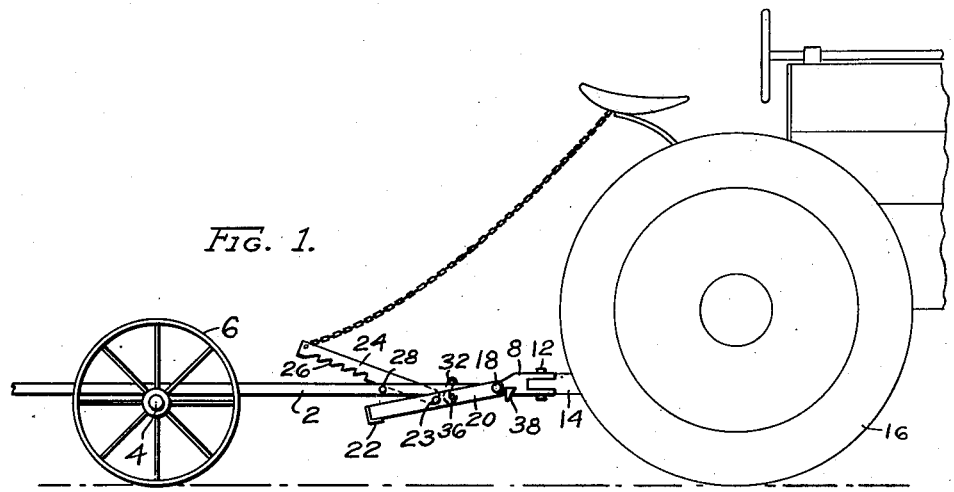
Fig. 1 is a side elevational view of the hitch in draft position.
Figure 2:
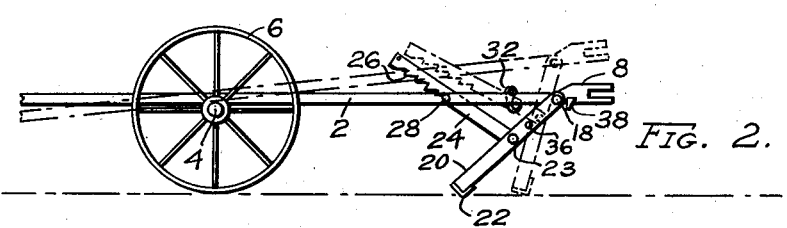
Fig. 2 is a view of the hitch being lowered as the tractor reverses.
Figure 3:
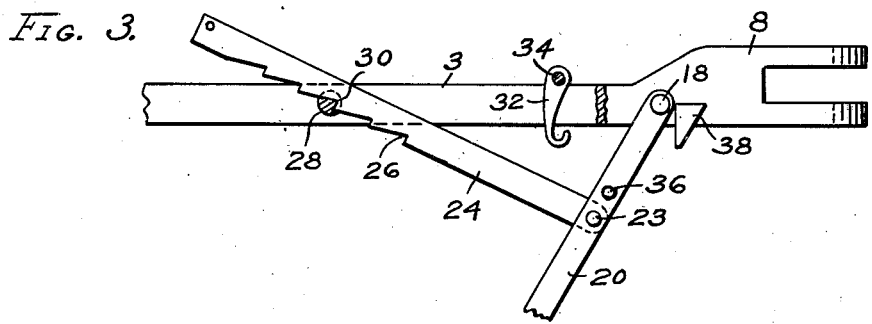
Fig. 3 is a detail view of the lowering mechanism partially lowered.

Referring now to the drawings, I have illustrated a hitch carrying a pair of arms 2 and 3 on the axle 4 of wheels 6 of any trailer or drawn vehicle. The usual connecting yoke 8 is provided at the front connected end of the arms and fashioned with apertures 10 for coupling pin 12 for connection with the draw bar 14 of the tractor having rear wheels 16.

Pivotally mounted at 18 just to the rear of the yoke 8 I provide a pair of legs 20 having a lower end cap 22 of such length as to support the arms 2 and 3 horizontally when lowered to ground engaging position. Pivoted at 23 intermediate the ends of leg 20 I use an arm 24 having ratchet notches 26 for engagement with the shaft 28 formed with a sharp edge 30 between the arms 2 and 3 and supporting the arm 24.

A hook 32 pivoted at 34 on the rear of the yoke co-acts with lug 36 on the arm 24 to support the leg 20 when its use is not desired, and when it is advisable to disconnect the tractor from the trailer the leg 20 is released from the hook 32 and allowed to pivot downwardly. With the tractor reversed the lower cap of the leg will engage the ground continuing to pivot until it abuts the stop 38, meanwhile the notches of the arm 24 having been riding over the edged shaft 28 to prevent retrograde movement.

The coupling pin may be removed and the drawn vehicle will remain supported until hitched whereupon the ratchet arm is released and the leg may be swung up manually to be secured by hook 32.

Having thus fully described my invention what I claim as new and desire to secure by Letters Patent is:

1. In combination with the draw bar of a trailer which draw bar comprises a pair of arms with a cross shaft provided with a sharp ratchet-engaging edge extending therebetween, a pivoted leg lowerable into ground-engaging positions to elevate the draw bar upon reverse movement of the trailer, a notched arm providing a ratchet pivoted on said leg for securing said leg in a vertical draw bar supporting position, said ratchet engaging said sharp edge in said cross shaft of said draw bar, a pivoted hook for securing said leg in inoperative position, said hook being secured to said draw bar, and a lug on said pivoted leg adapted to be seated in said hook when said leg is in inoperative position.

2. In combination with the draw bar of a trailer, which draw bar includes a pair of arms with a cross shaft provided with a sharp ratchet-engaging edge extending therebetween, a pivoted leg lowerable into ground-engaging position to elevate the draw bar upon reverse movement of a trailer, a notched arm providing a ratchet pivoted on said leg for securing said leg in vertical draw bar supporting position, said ratchet engaging said sharp edge on said cross shaft, a pivoted hook for securing said leg in inoperative position, said hook being secured to said draw bar, a lug on said pivoted leg adapted to be seated in said hook when said leg is in inoperative position, and a stop secured to said draw bar limiting swinging movement of said pivoted leg.

JAMES E. LUTTRELL.

REFERENCES CITED

The following references are of record in the file of this patent:

UNITED STATES PATENTS

| Number | Name | Date |
|---|---|---|
| 1,908,704 | Hamren | May 16, 1933 |
| 2,207,812 | McClellan | July 16, 1940 |
| 2,225,157 | Court | Dec. 17, 1940 |
| 2,256,310 | Braley et al. | Sept. 16, 1941 |
| 2,309,618 | Hyland et al. | Jan. 26, 1943 |
| 2,400,145 | Zink et al. | May 14, 1946 |